No. 777,979. PATENTED DEC. 20, 1904.
J. F. DE SAVIGNAC.
PNEUMATIC TIRE.
APPLICATION FILED APR. 6, 1904.
NO MODEL.

WITNESSES:
Henry J. Suhrbier.
Jacob H. Glaser.

INVENTOR.
Jules Fornier de Savignac
BY
Joquex Niles
ATTORNEYS.

No. 777,979.

Patented December 20, 1904.

UNITED STATES PATENT OFFICE.

JULES FORNIER DE SAVIGNAC, OF MARSEILLES, FRANCE.

PNEUMATIC TIRE.

SPECIFICATION forming part of Letters Patent No. 777,979, dated December 20, 1904.

Application filed April 6, 1904. Serial No. 201,894.

*To all whom it may concern:*

Be it known that I, JULES FORNIER DE SAVIGNAC, a citizen of the Republic of France, and a resident of Marseilles, France, have invented certain new and useful Improvements Relating to Pneumatic Tires for Vehicle-Wheels, which improvements are fully set forth in the following specification.

This invention has for its object an improved unpuncturable protector for pneumatic tires for vehicle-wheels, and which is adapted for application to the wheels of all kinds of vehicles for protecting them from injury from nails, broken glass, and the like.

Figure 1:
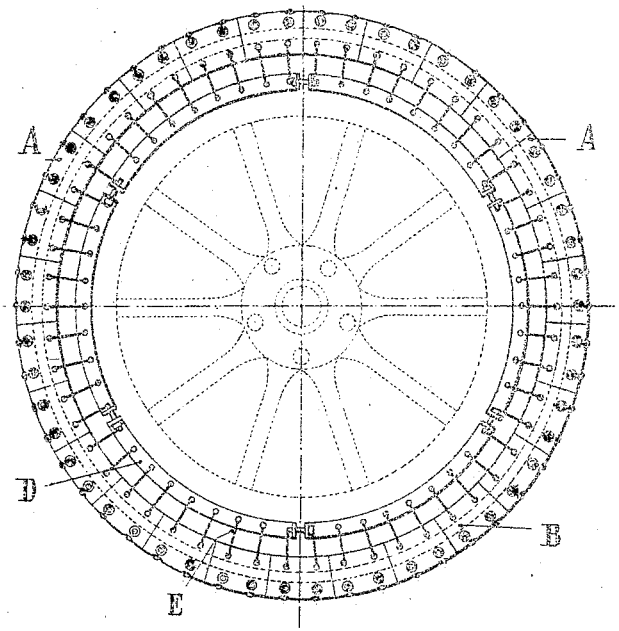
Figure 2:
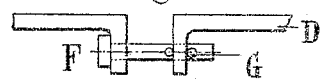
Figure 3:
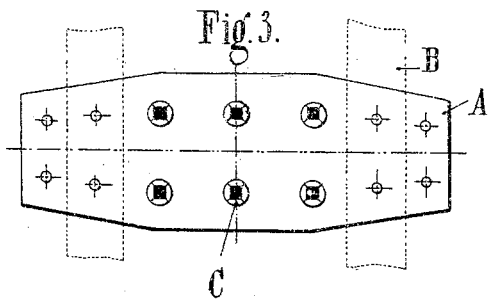

In the accompanying drawings, which are given by way of example, Figure 1 is a side elevation of a tire provided with the improved protector, the wheel to which the tire is applied being shown in dotted lines. Fig. 2 is a detail view showing the connection of the hoops, and Fig. 3 is a detail view of a tread portion.

Referring to the drawings, A designates a number of tread-sections, of leather or other suitable tire-protecting material, which are placed contiguous to one another so as to entirely cover the tread-surface of the tire. Nails C are riveted into each tread-section A, so as to increase the wear-resisting qualities of the same and diminish the liability of puncturing the tire. The tread-sections A are fastened by rivets or in any suitable manner to a number of bands B of flexible material, which lie on the surface of and parallel to the tire.

In order to firmly retain the tread-sections A on the tread-surface of the tire, detachable retaining-hoops D are provided, to which said tread-sections are connected at either side by hooks E, engaging holes in the tread-sections and in the hoops. The retaining-hoops D are disposed at opposite sides of the tire, and each is composed of a number of hoop-segments provided with terminal shoulders, the contiguous shoulders of said hoop-segments being adjustably secured by means of bolts F passing through said shoulders, each of said bolts being adjusted by means of a pin G, adapted to engage any one of a number of holes extending longitudinally of the bolt.

The protective covering formed by the bands B and the tread-sections A is liable to become loosened on the tire, owing to the continual tension upon the hooks E or other fastening members connecting the protective covering and the retaining-hoops D. In this case it is only necessary to tighten the connection between the hoop-segments. As these are drawn together more closely by means of bolts F and pins G, the hoop D is diminished in diameter, and consequently an inward pull is exerted on the tread-sections A and the bands B, to which they are secured, so that they more closely engage the tire. The protector may be readily applied to and removed from tires of different diameters.

Obviously the constituent members of the device may be varied in construction, and the materials used in their manufacture may vary without departing from the spirit of the invention.

The improved protector is especially designed for use upon automobiles and other high-speed vehicles in which the tires are subject to great strain, as it increases the life of the tire to which it is applied, while obviating the liability of puncturing the same.

Having thus described my invention, I claim as new and desire to secure by Letters Patent—

1. The combination, with a wheel and its tire, of a plurality of tire-protecting tread-sections, retaining-hoops disposed at either side of the tire, and each consisting of a plurality of contiguous hoop-segments, bolts for adjustably connecting said hoop-segments, and means for connecting said tread-sections and said retaining-hoops.

2. The combination, with a wheel and its tire, of a plurality of tire-protecting tread-sections, retaining-hoops disposed at either side of the tire, each consisting of a number of segments provided with terminal shoulders, means for adjustably connecting the contiguous shoulders of adjacent segments, and means for connecting said tread-sections and said retaining-hoops.

3. A retaining-hoop for tire-protectors, comprising a number of flat hoop-segments each provided with terminal shoulders, and means for connecting the contiguous shoulders of the adjacent segments.

4. The combination, with a wheel and its tire, of a plurality of bands located at the sides of the tire in a plane parallel thereto, tread-sections attached to said bands and having their ends extending beyond the same, retaining-hoops disposed at either side of the tire, and means for connecting the overlapping ends of said tread-sections with said retaining-hoops.

5. The combination, with a wheel and its tire, of bands engaging the tire in a plane parallel thereto, tire-protecting tread-sections attached intermediately to said bands and provided with openings at their overlapping ends, retaining-hoops disposed at either side of the tire and provided with openings corresponding to those in the tread-sections, and connecting members engaging the corresponding openings in the tread-sections and in the retaining-hoops.

In testimony whereof I have signed this specification in the presence of two subscribing witnesses.

JULES FORNIER DE SAVIGNAC.

Witnesses:
MAURICE HUBERT,
PIERRE CONRADI.